(12) United States Patent
Ohms

(10) Patent No.: US 6,784,649 B1
(45) Date of Patent: Aug. 31, 2004

(54) SWITCH CONTROLLER

(75) Inventor: Franz Ohms, deceased, late of Oberrot (DE), by Gabriele Ohms, heir

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/623,342
(22) PCT Filed: Dec. 21, 1998
(86) PCT No.: PCT/DE98/03741
§ 371 (c)(1), (2), (4) Date: Dec. 16, 2002
(87) PCT Pub. No.: WO99/45630
PCT Pub. Date: Sep. 10, 1999

(30) Foreign Application Priority Data

Mar. 5, 1998 (DE) .......................... 198 09 385

(51) Int. Cl.[7] ................................. G05F 1/40
(52) U.S. Cl. ..................... 323/284; 323/282; 323/285
(58) Field of Search ................. 323/282, 284, 323/285, 286, 274, 222

(56) References Cited

U.S. PATENT DOCUMENTS

| 4,885,674 A | 12/1989 | Losic et al. ............... 363/21 |
| 5,747,976 A | * 5/1998 | Wong et al. ............... 323/282 |
| 5,754,414 A | * 5/1998 | Hanington ............... 363/21.12 |
| 5,801,518 A | * 9/1998 | Ozaki et al. ............... 323/222 |
| 5,905,370 A | * 5/1999 | Bryson ..................... 323/283 |
| 5,939,871 A | * 8/1999 | Tanaka ..................... 323/285 |
| 5,943,227 A | * 8/1999 | Bryson et al. ............... 363/95 |

FOREIGN PATENT DOCUMENTS

| EP | 0 355 333 | 2/1990 |
| WO | WO 97/34363 | 9/1997 |

* cited by examiner

Primary Examiner—Bao Q. Vu
(74) Attorney, Agent, or Firm—Kenyon & Kenyon

(57) ABSTRACT

In a switching controller whose error signal amplifier essentially exhibits P action, the load step performance of the switching controller is detected via an evaluation circuit. This signal is fed directly to the pulse-duration or pulse-frequency modulator for the final controlling element, substantially circumventing the error signal amplifier for the switching controller. Through this measure, output capacities of the switching controller can be reduced without stability problems.

8 Claims, 2 Drawing Sheets

SWITCH CONTROLLER

FIELD OF THE INVENTION

The present invention relates to a switching controller in whose control loop an error signal amplifier is provided, which exhibits P (proportional) action and which acts on a pulse duration modulator or frequency modulator for the final controlling element of the switching controller.

BACKGROUND INFORMATION

A controller of the above-mentioned type is described in European Patent No. 0 355 333.

PCT Application WO 97/34363 describes a switching controller which, besides the conventional control loop for the error signal at the output of the switching controller, has an additional control loop with which a correction quantity, which is a function of the load variation, is computed. This correction quantity is additively superimposed on the error signal in order to reduce voltage fluctuations given pulse-shaped load variations at the output of the switching controller.

U.S. Pat. No. 4,885,674 describes a similar switching controller having two such control loops.

In the switching controller described in European Patent No. 0 355 333, noise signals on the input voltage are optimally suppressed in their effect on the output voltage of the switching controller without the control rate being adversely affected, for instance given sudden load variations. In order to prevent large voltage dips given sudden load variations at the output, for instance in the TDMA operation of a traveling-wave amplifier in a satellite, the voltage control loop must be properly dimensionally designed (high P component in the error signal amplifier). This can only be done when accompanied by a large enough output capacity, if the aim is for no stability problems to occur.

SUMMARY

In accordance with the present invention, it is possible to dimensionally design the control loop to have a low P components. The output capacities of the switching controller can be reduced without causing control stability problems. This leads to a smaller type of construction for switching controllers in high-voltage parts, where substantial outlay is required for smoothing capacitors.

In accordance with the present invention, the control loop can be dimensionally designed to have a low P-component using so-called forward (unidirectional) control; circumventing the error signal amplifier. The step change in load is directly detected and delivered to the pulse-duration or pulse-frequency modulator, without the actual control loop having to respond. As a result of this precontrol, fewer automatic control delays follow step changes in load, without giving rise to stability problems.

When only the alternating component of the load current is detected for the precontrol, the precontrol decays with a time constant that can be selected such that the error signal amplifier can easily compensate for the decaying precontrol.

DETAILED DESCRIPTION

Figure 1:
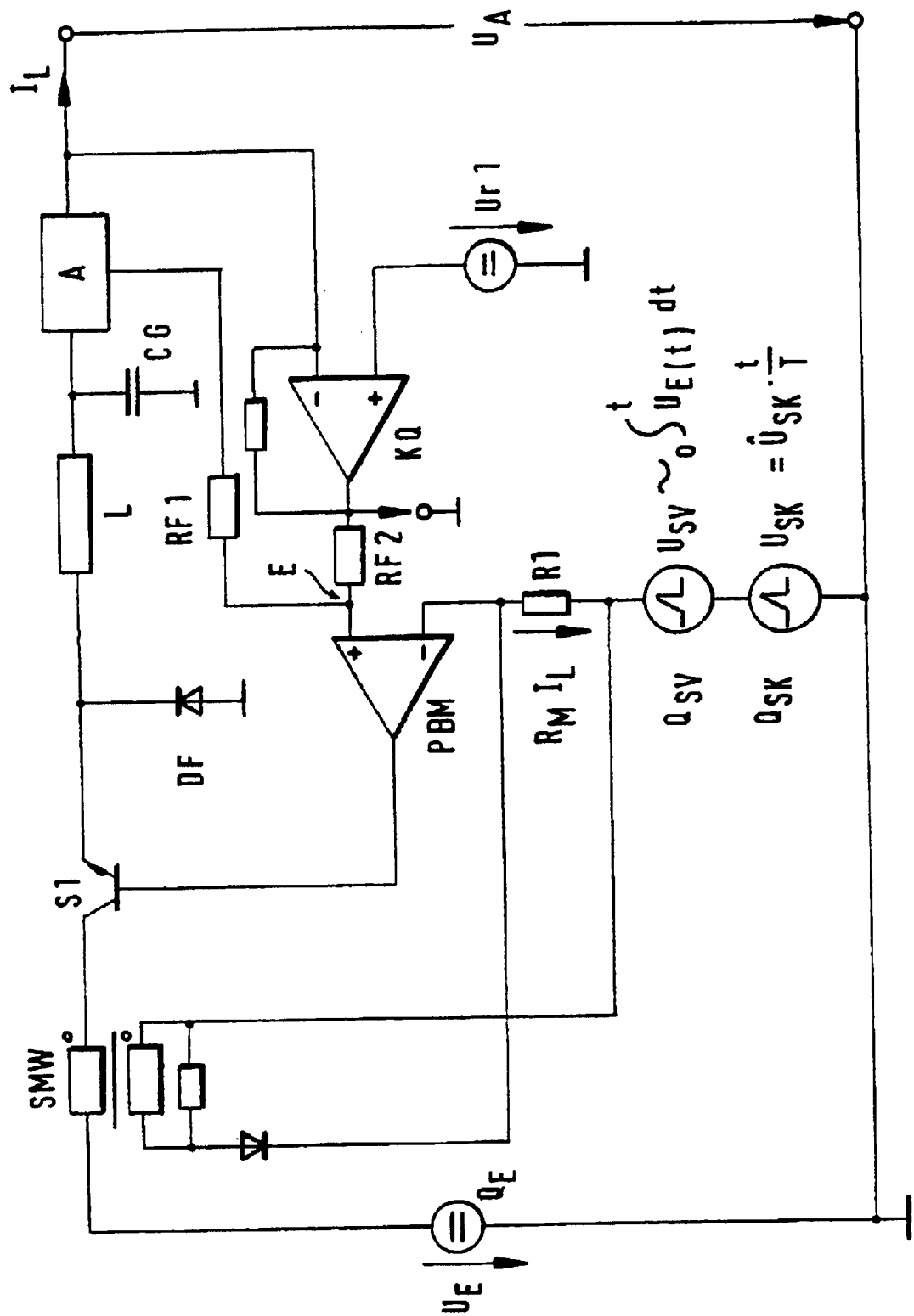
FIG. 1 shows a basic circuit diagram of a switching controller in accordance with the present invention.

The switching controller illustrated in FIG. 1 is designed as a step-down controller. It has an input d.c. voltage source $Q_E$, including a terminal voltage $U_E$. Disposed between the positive pole of the input d.c. voltage source $Q_E$ and the positive pole of the switching controller output having output voltage $U_A$ is the series circuit of the switching controller's final controlling element S1 in the form of a switching transistor and inductor L of the switching controller. The freewheeling diode of the switching controller is denoted by DF, and the output-side smoothing capacitor by CG. Output voltage $U_A$ is fed to an error signal amplifier KO, which compares it to a reference voltage Ur1. If output voltage $U_A$ exceeds reference d.c. voltage Ur1, a control signal is transmitted to pulse-duration modulator PBM (non-inverting input), whose output signal determines the pulse duty factor (ON duration relative to OFF duration) of final controlling element S1. Connected to the inverting input of pulsewidth modulator PBM and of the common ground, is the series circuit composed of a resistor R1 and two signal sources $Q_{SV}$, $Q_{SK}$, which supply saw-tooth signals $U_{SV}$ and $U_{SK}$. A voltage that is proportional to the input current of the switching controller drops across resistor R1. This is achieved in that resistor R1 is traversed by the flow of the rectified secondary current of a current transformer SMW, whose primary winding is located at the input circuit of the switching controller between input d.c. voltage source $Q_E$ and final controlling element S1. The signal source $Q_{SK}$ carries a saw-tooth voltage:

$$U_{SK(t)} = \hat{U}_{SK} t/T$$

t indicating the time, T the period duration of the saw-tooth repetition frequency, and $\hat{U}_{SK}$ the maximum amplitude of the saw-tooth voltage. The maximum amplitude $\hat{U}_{SK}$ of the saw-tooth voltage is kept constant. RM designates the resistance value of resistor R1 for detecting the current through the final controlling element; i.e., in the case of current detection by a current transformer as in FIG. 1, the resistance value multiplied by the reciprocal (inverse) value of the transformation ratio of current transformer SMW. Then, $$RM = \frac{R1}{\ddot{u}1}$$

applies, ü designating the transformation ratio of current transformer SMW. Thus, to be able to maintain the stability conditions, a certain minimum saw-tooth amplitude is required, which cannot be provided solely by the control as a function of output voltage $U_A$. One can modify the action of the current control amplitude by modulating the saw-tooth amplitude by way of the input voltage. For this, an additional signal source $Q_{SV}$ is provided, which carries a saw-tooth voltage $$U_{sv(t)} = \frac{1}{RC} \int_0^t U_{E(t)} \, dt$$

Thus, this saw-tooth voltage $U_{SV}(t)$ is proportional to integrated input voltage $U_E(t)$. The time dependency of input voltage $U_E$ of the switching controller is substantially the result of superimposed alternating components, such as a 100 Hz ripple voltage in the case of a switched-mode power supply. This noise is optimally suppressed when the arithmetic mean of current $I_o$ through inductor L is constant. To optimally suppress fluctuations in input voltage and satisfy the stability requirement, the conditions discussed in detail in European Patent No. 0 355 333 are met.

The present invention provides for the load step performance of the switching controller to be detected, in particular, the alternating component of load current $I_L$, to be suitably amplified, and fed via a coupling device E between error signal amplifier KO, exhibiting P action, to pulse-duration modulator PBM, via an evaluation circuit A, which, in the present exemplifying embodiment, is arranged between output-side smoothing capacitor CG and an output terminal of the switching controller. The supplying of the load-step-dependent signal directly to the input of pulse-width modulator PBM does not alter the stability of the controller, particularly with respect to phase margin and gain margin. As shown in FIG. 1, coupling device E can be composed of a simple adding node or of an adding circuit, where the output signal from error signal amplifier KO is gated with the signal detected by evaluation circuit A. The two gated signals may then be fed to the adding node via resistors RF1 and RF2 of equal value.

Figure 2:
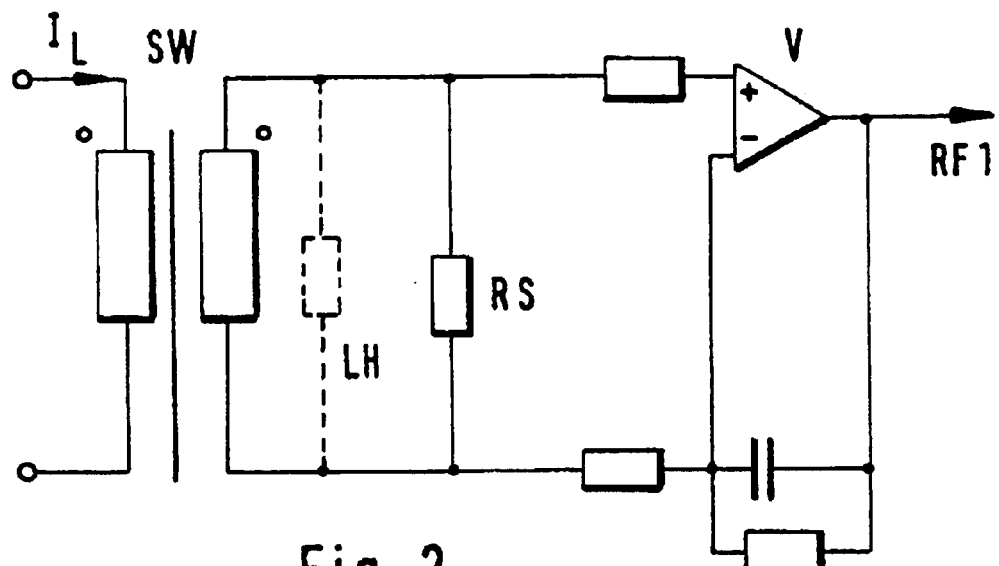
FIG. 2 shows an evaluator for detecting a step change in load.

As FIG. 2 shows, the alternating component of load current $I_L$ is expediently detected by evaluation circuit A via a measuring current transformer SW and an amplifier V that is connected in series therewith. If there is no change in the load current, i.e., no change in current $I_L$ (e.g., given a step change in load), then there is no signal at resistor RF1. As is evident from FIG. 1, given resistors RF1 and RF2 of equal value, the output signal from error signal amplifier KO is effectuated at pulse duration modulator PBM with the half-amplitude ½ $U_{KO}$. If the controller gain is now increased by a factor of two, it can be seen that the additional precontrol does not influence the normal control loop via the signal that is detected by the evaluation circuit A; i.e., the controller stability is not changed. If the load then changes, namely if there is a modulation of the load current, then pulse duration modulator PBM is appropriately precontrolled without the actual control loop having to respond.

Since, for example only the alternating component of load current $I_L$ is detected, the precontrol decays with time constant TAU=LH/RS, LH representing the primary inductance of measuring current transformer SW, and RS representing the cross resistance shown in FIG. 2. Specifically, a great enough time constant TAU is selected to allow error signal amplifier KO to easily compensate for the decaying controller deviation of the precontrol.

Instead of a pulse duration modulator, a pulse frequency modulator can also be provided for the switching controller. Furthermore, the present invention can be used for any type of switching controller, such as an step-up controller, a flow transducer, an isolating transformer, etc. The present invention is particularly suitable for high-voltage parts for traveling-wave amplifiers in ground stations or satellites, where the smoothing or filtering outlay must be minimized. In these cases, the detected load current is, in particular, the collector current of the traveling-wave tube, which is transformed into the low-voltage side of the switching controller using measuring current transformer SW.

Depending on the type of switching controller and the disturbing influences, e.g. input voltage fluctuations, etc., the signals at the second input of the pulsewidth/frequency modulator that are needed for optimal controller stability are different.

Figure 3:
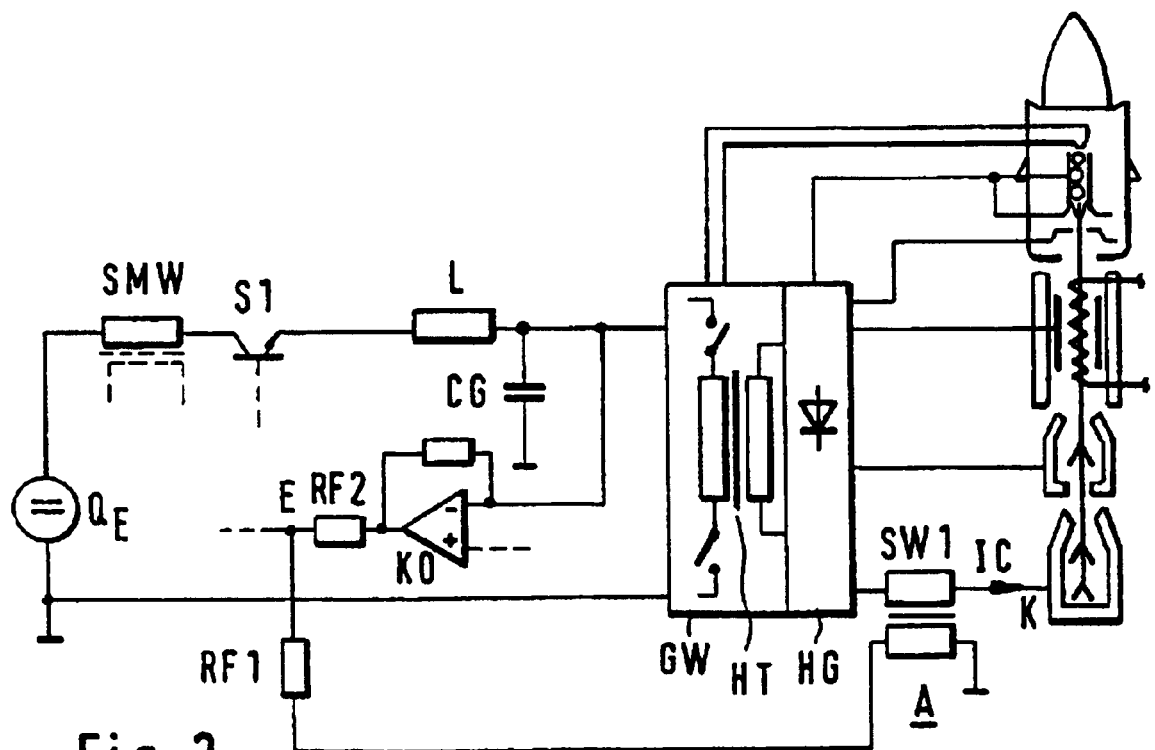
FIG. 3 shows the detection of the collector current of a traveling-wave amplifier.

In the switching controller represented in FIG. 3 of European Patent No. 0 355 333, these are:

a saw-tooth signal $Q_{SK}$ of constant amplitude;

a signal $RMI_L$ that is proportional to the current that is conducted through final controlling element S1; and a saw-tooth signal $Q_{SV}$, whose peak amplitude is selected in proportion to the integrated input voltage of the switching controller.

In the example embodiment shown in FIG. 2 of EP 0 355 333, a d.c. voltage signal $U_N$ is also included, which is selected in proportion to the level of the input voltage of the switching controller.

According to the present invention, it is possible to obtain a signal that is dependent upon the step change in load using a quantity other than the load current, for instance by detecting voltage jumps in the power circuit of the switching controller. These quantities can be suitably processed and fed as precontrol signals to the pulse-duration modulator or frequency modulator.

In the example embodiment represented in FIG. 3 of the present invention, the alternating component of the collector current of a traveling-wave amplifier is detected. The switching controller is used here as precontroller for a push-pull transformer GW. A high-voltage transformer HT that delivers the supply voltages for traveling-wave tube WF via high-voltage rectifier circuit HG is located in the output circuit of push-pull transformer GW. The primary winding of measuring current transformer SW1 of evaluation circuit A for evaluating collector current IC is located in the collector feed line to collector K of traveling-wave tube WF. The secondary coil is connected as shown in FIG. 2. The output of evaluation circuit A leads via resistor RF1 to coupling device E, as shown in FIG. 1. In traveling-wave tubes having two collectors, it usually suffices to evaluate one collector current as shown in FIG. 3, particularly the current of the collector that is situated in the immediate vicinity of the Wehnelt cylinder.

What is claimed is:

1. A switching controller, comprising:

a final controlling element;

a pulse-duration or pulse-frequency modulator coupled to the final controlling element, the pulse-duration or pulse-frequency modulator controlling the final controlling element;

an error signal amplifier coupled to the pulse-duration or pulse-frequency modulator, the error signal amplifier exhibiting P action and acting on the pulse-duration or pulse-frequency modulator;

an evaluation circuit to detect a load performance of the switching controller, the evaluation circuit configured to detect only an alternating component of a load-step dependent signal of the switching controller, a time constant of the evaluation circuit being set so that the error signal amplifier compensates for a decaying control deviation of the signal detected by the evaluation circuit, the signal detected by the evaluation circuit being provided as a pre-control signal for the pulse-duration or pulse-frequency modulator; and a coupling device for the signal detected by the evaluation circuit, the coupling device provided between an output of the error signal amplifier and an input of the pulse-duration or pulse-frequency modulator.

2. The switching controller according to claim 1, wherein the coupling device includes an adding circuit or node, an output signal from the error signal amplifier being gated with the signal detected by the evaluation circuit.

3. The switching controller according to claim 1, wherein an amplitude of an output signal of the error signal amplifier is modified in comparison with a switching controller without a coupling device to a degree corresponding to a load-step-dependent value detected by the evaluation circuit.

4. The switching controller according to claim 1, wherein the signal detected by the evaluation circuit is an alternating component of a load current of the switching component.

5. The switching controller according to claim 2, wherein the signal detected by the evaluation circuit and an output signal of the error signal amplifier are routed to the adding circuit or node via resistors of equal value.

6. The switching controller according to claim 1, wherein the evaluation circuit includes a measuring current transformer and a downstream amplifier, the downstream amplifier being downstream from the measuring current transformer.

7. The switching controller according to claim 1, wherein the pulse-duration or pulse-frequency modulator is fed an output signal from the error signal amplifier together with a superimposed output signal of the evaluation circuit, on the one hand, and a combination of at least two of the following signals, on the other hand:

- a saw-tooth signal of constant amplitude,
- a signal proportional to current conducted through the final controlling element,
- a saw-tooth signal having a peak amplitude in proportion to an integrated input voltage of the switching controller, and
- a d.c. voltage signal in proportion to a level of an input voltage of the switching controller.

8. The switching controller according to claim 1, wherein a collector current of a traveling-wave tube is detected via the evaluation circuit.

* * * * *